May 1, 1951 I. M. LE BARON 2,550,829
MINERAL RECOVERY PROCESS
Filed March 4, 1949
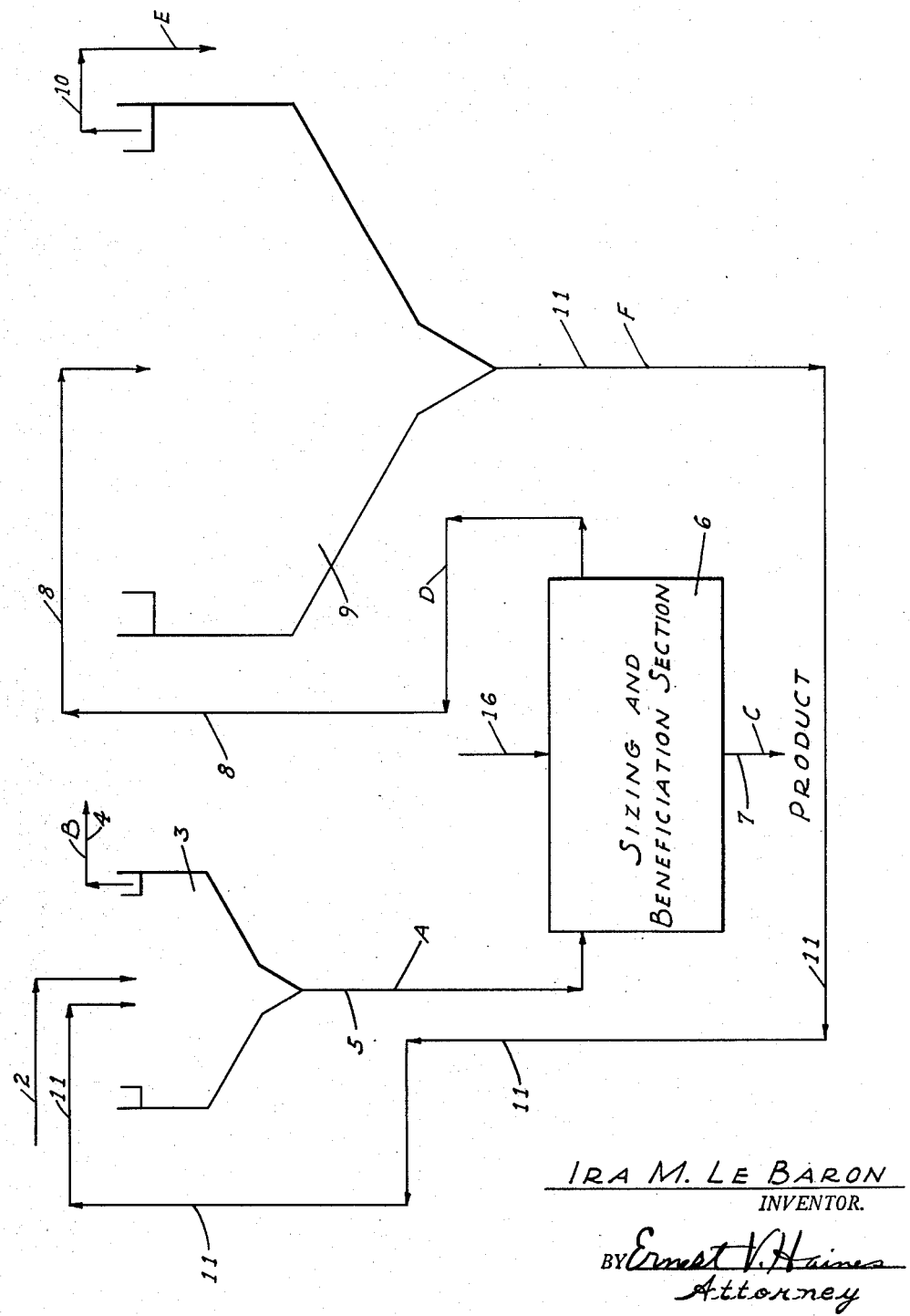
IRA M. LE BARON
INVENTOR.
BY Ernest V. Haines
Attorney Patented May 1, 1951

2,550,829

UNITED STATES PATENT OFFICE 2,550,829

MINERAL RECOVERY PROCESS

Ira M. LeBaron, Lakeland, Fla., assignor to International Minerals & Chemical Corporation, a corporation of New York Application March 4, 1949, Serial No. 79,684

4 Claims. (Cl. 209—155)

This invention relates to a process of recovering mineral values from slimes and gangue, and nonrecoverable constituents. In particular, the invention is applicable to the beneficiation of phosphate ores such as Florida pebble phosphate ore bodies.

In processing pebble phosphate ore bodies, generally speaking, the material is mined from the natural deposit and transferred to washers and then flotation plants as a slurry with water. This slurry contains sizable amounts of silica, clay (slime), and other gangue materials. It is, of course, the object of all subsequent operations to recover the phosphatic values in as pure a form as possible and substantially free of slimes. The phosphate particles must be of such a size that they may be economically treated in the concentration process. As an initial process in attaining this object, usually the slurry is subjected to preliminary treatment in a section known as a washer plant, wherein a sizable quantity of the coarse phosphatic values are removed by a screen operation which produces for marketing a coarse pebble containing all of the +1 mm. values. The −1 mm. values containing the phosphatic particles, silica particles, and the slimes as a slurry must now be further processed to give maximum recovery of the granular material and substantially complete removal of the slime material which, if allowed to remain, would adversely affect the subsequent concentration process (silica removal).

In the past, a rough separation of these slimes from subsequently recovered phosphatic values has been accomplished in a number of ways. As practiced commercially in the phosphate fields of Florida, recourse to a rough hydroseparation process has been undertaken. As originally built in this area, beneficiation plants for the recovery of phosphate concentrates were of relatively small tonnage output as compared with present-day requirements. This necessitated the installation and use of moderate-sized hydroseparators. Under present-day conditions and use, however, and with a markedly increased tonnage from these phosphate fields required, a serious limitation has been imposed upon the over-all size of these recovery plants because of the structural difficulties encountered in building hydroseparators large enough to take care of the increased volume of liquids and solids to be processed. In other words, the increased throughput required to satisfy present-day demand for phosphate concentrates—theoretically, at least—requires hydroseparators of such increased dimensions that real structural difficulties are encountered in attempting to build such units of a sufficient size to handle the increased volume of liquids and solids being processed.

It is the primary object of this invention to obtain maximum recovery of phosphatic values containing a minimum amount of slime material from a process requiring a minimum capital investment, and to simultaneously recover a maximum percentage of the water used, in a reusable form.

It is another object of the invention to efficiently recover mineral values from gangue and nonrecoverable constituents of the so-called nonmetallic ores with the aid of a liquid medium in which the desired mineral values are substantially insoluble under the conditions obtaining.

It is a further object of the invention to accomplish an over-all more efficient separation of slimes from phosphatic values, while at the same time maintaining an increased throughput in the recovery plant.

It is a further object of the invention to accomplish efficient segregation of recoverable phosphatic values from slimes, while at the same time obviating the necessity for building recovery and processing equipment of the expected size sufficient, ordinarily, to process the increased volumes of slurry to be put through such operations.

It is a further object of the invention to accomplish water recovery in phosphate beneficiation operations.

It is a still further object of the invention in the beneficiation of phosphatic values to recover water which has previously been used in the plant and which contains residual values of reagents employed in the beneficiation operations.

Other objects will be apparent upon a fuller understanding of the invention as hereinafter outlined in greater detail.

The present invention relates to a process of separating mineral content of a so-called nonmetallic ore from the gangue and nonrecoverable constituents by pulping the ore in water or other liquids in which the desired ore constituents are essentially insoluble under the conditions obtaining, and separating the pulped ore into a high density ore fraction which contains substantially all of the recoverable mineral, and a low density ore fraction which contains a major portion of the nonrecoverable mineral, slime, and other gangue constituents of the original ore. The high density ore fraction is then subjected to a separation and/or beneficiation operation, preferably with the aid of reagents, which results in a desired upgraded mineral concentrate as a final product but which, at the same time, also results in the usage of large quantities of added liquid medium, said medium finally containing relatively small amounts of desirably recoverable ore constituents. This resulting slurry is in relatively large amount and, because of the solids content thereof, economically must be salvaged or at least not allowed to be removed from the process system. The slurry is therefore subjected to a separation operation or fractionation for the dual purpose of retaining the recoverable mineral values and for retaining, for reuse and recycle in the system heretofore mentioned, liquid medium which will nearly always contain some quantities of the reagents used. A separation or fractionation so effected gives one fraction comprising essentially liquid medium; and another fraction, of much higher density, of recoverable values which are returned as a slurry to the original pulped ore separation or fractionation operation. Because of the fact that in the beneficiation operation large quantities of added liquid medium are required, this recovered liquid medium fraction is returned to the system for reuse; thus saving a considerable amount of liquid medium, much of which has been previously conditioned during the beneficiation operation—at least to a partial extent—through the conventional use of various reagents and conditioners.

More specifically, the present invention provides an economical way of processing large gallonages of slurries with the retention, within the over-all system, of the liquid medium; and the removal from the system, as product, of large tonnages of desired mineral concentrate. The process is successfully employed in the production of phosphate concentrates from matrix obtained in the Florida pebble phosphate areas. The liquid medium employed in such an instance is water.

Referring now to the drawing, Figure 1 represents a diagrammatic flow sheet, in sectional elevation, of a suitable process for the processing of phosphate matrix of the type found in the Florida areas, and using water as the liquid medium.

The pebble phosphate matrix dug at the mine is slurried with water and pumped to a washer where all particles having a diameter of approximately +1 mm. are removed from the slurry and marketed as Florida pebble phosphate. The remaining slurry, which comprises essentially phosphate particles of various sizes, clay, silica, etc., is then piped through line 2 into a separation or size fractionation device 3. The rate of introduction into device 3 will be discussed hereinafter in further detail. The overflow from separation device 3 is withdrawn from the system through line 4. This low density fraction constitutes the slimes of the system and is made up chiefly of dissolved and suspended clay, and extremely fine particles of phosphate; i. e., particles of a sufficient degree of fineness that they could not be recovered at any subsequent step of the process. A relatively high density solids slurry is withdrawn from separation device 3 through line 5. This comprises the feed fraction to a sizing-beneficiation process 6 which may involve any number of heretofore known expedients. In general, tabling or froth flotation operations which are well known in the industry are applied to this feed material in order to free it of silica and minor amounts of other gangue material, and in order to produce a final phosphate concentrate running as high as 77–78% bone phosphate of lime. This material is sold in commerce as phosphate concentrate. In the tabling and/or froth filtration concentration operations, reagents are employed depending upon the particular process involved. In one such operation, fuel oil, kerosene, along with long chain fatty acids and caustic soda are used. In still other operations, primary monoamines derived from long chain fatty acids are used. Before either a tabling or froth flotation operation may be carried out, it is necessary that the feed to the process be admixed with relatively large quantities of water. This is introduced, as shown, through line 16. It is also advisable for the concentrated phosphate ultimately produced to be freed, insofar as economically possible, from these large quantities of water. Also, during the flotation and/or tabling operations, the water used will be at least partially saturated with respect to the reagents and conditioners employed; and it is therefore economical to retain within the plant circuit that water which has been employed in the tabling and flotation operations. In addition, small amounts of recoverable phosphate are present in these waters, and can be recovered.

In order to accomplish these purposes, the slurry containing a volume of water, a plurality of times as large as the volume of water originally contained in the pulped ore introduced into the sizing-beneficiation operations by line 5, and containing recoverable phosphate values, is conducted through line 8 into separating device 9, which is of large area and operates so that the overflow therefrom conducted away by means of line 10 comprises essentially water. The underflow from separating device 9 provides a relatively high density slurry which is conducted by means of line 11 back to original pulped ore separation device 3 for recycling through the circuit. This material may be returned to the system through the beneficiation step, if desired, but it is preferred to recycle this material as shown in Figure 1. The contents of line 11 comprise recoverable phosphate values and slimes, together with plant water which, of course, is conserved through its recycle through the system.

Although not shown in the drawing, the water removed from the system through line 10 is returned to the system from a large reservoir (not shown) at a plurality of points, chiefly to the beneficiation process 6 and represented by line 16.

As representative of the practical operation of this system, the following specific example is given and described with respect to the operation in Figure 1. In a typical plant run, and using the flow sheet in Figure 1, the following operational conditions are maintained. Line 2 has passing through it a slurry which contains approximately 25% solids, the rest being substantially water. This is fed into separating device 3 (which has a total surface area of approximately 24,200 square feet) at the rate of about 12,000 gallons per minute. In addition to this, line 11 delivers to the same piece of equipment approximately 2500 gallons per minute. From separating device 3 there overflows, and is removed from the system by means of line 4, approximately 11,000 gallons per minute of slimes and water. The underflow, line 5, containing about 40% solids, is removed from the separating device 3 at the rate of about 3500 gallons per minute. Under these conditions, approximately ten tons per hour of valuable but nonrecoverable material will be lost in the waste discharge, line 4. However, line 5 delivers to the beneficiation section 6, approximately 450 tons per hour of material to be processed. This is processed through sizing-beneficiation plant 6, and a desired phosphate concentrate removed from the system as represented at line 7. However, during the processing, sizing, and beneficiation, large quantities of water are required. Approximately 30,000 gallons per minute of water is introduced diagrammatically by line 16 into beneficiation step 6, and approximately 27,000 gallons per minute will be removed from the system through line 8. This contains approximately 12 tons per hour of recoverable solids, together with a considerable amount of nonvaluable slimes. This material is then subjected to separation in device 9 which has an approximate surface area of 230,000 square feet. Ordinarily, two such devices—each having about 115,000 square feet of area—are used. They are connected in parallel. From separation device 9, or from two such devices of one-half the total area stated, approximately 25,000 gallons per minute of relatively clear water, but also containing small quantities of reagents employed in step 6, is removed as overflow and either returned directly to beneficiation step 6 as additional water for the system, or placed in a storage reservoir for use as required. The underflow from separation device 9, or two such devices as previously stated, will contain substantially all the solids introduced into this device, and is removed by means of line 11 at the rate of 2500 gallons per minute and introduced into separation device 3 for reprocessing.

In a conventional flow sheet of prior phosphate recovery operations and, as heretofore known, with the volume in line 8 delivered in addition to that delivered in line 2 to separation device 3, the total gallonage to the separation device 3 will be approximately 39,000 gallons per minute. To adequately handle that volume of material and obtain an efficient separation of slimes from recoverable desired solids would require a surface area for the separating device of an impractical and colossal size because of the tremendous forces required in delivering the solids to the underflow. If the area of the separation device 3 were held the same as was used in the preceding example, then the losses in line 4 of desired recoverable material would approximate 30 tons per hour instead of the ten tons per hour indicated in the preceding example, because the increased throughput would not allow for sufficient settling time for the desired recoverable solids, and they would then escape with the slimes. Thus, it is apparent that without the use of separation device 9 and flow sheet of Figure 1, approximately 150,000 tons per year of recoverable phosphate material processed when using the system outlined in Figure 1 would be lost in the slimes of line 4 when using the above referred to conventional system.

Simultaneous with this large recovery of phosphatic values for processing in the plant, when following the instant novel process, 25,000 gallons per minute of water which contains expensive reagents is also recovered for reuse. This is all lost to waste, under prior practices.

Having now thus fully described and illustrated the character of the invention, what is desired to be secured by Letters Patent is:

1. In a process of separating phosphate concentrate from a phosphate ore containing slime and other gangue wherein said ore is pulped with water, the pulped ore separated into a fraction A of high solids content including substantially all of the recoverable phosphate values and a slime fraction B containing slime and nonrecoverable phosphate, wherein fraction A is subjected to beneficiation treatment while using large additional amounts of water to separately produce therefrom a dewatered phosphate concentrate, a dewatered tailings fraction, and a low-density water fraction D containing a minor amount of recoverable phosphate, some slime, and a major amount of water; the improvements comprising separating fraction D into a fraction E comprising essentially water and a thickened fraction F of high solids content and containing the recoverable phosphate and some of the slime, and recycling fraction F to the initial slime separating step.

2. In a process of separating phosphate concentrate from a phosphate ore containing slime and other gangue wherein said ore is pulped with water, the pulped ore separated into a fraction A of high solids content including substantially all of the recoverable phosphate values and a slime fraction B containing slime and nonrecoverable phosphate, wherein fraction A is subjected to beneficiation treatment while using large additional amounts of water to separately produce therefrom a dewatered phosphate concentrate, a dewatered tailings fraction, and a low-density water fraction D containing a minor amount of recoverable phosphate, some slime, and a major amount of water; the improvements comprising separating fraction D into a fraction E comprising essentially water and a thickened fraction F of higher solids content and containing the recoverable phosphate and some of the slime, recycling fraction F to the initial slime separating step, and returning at least a portion of fraction E to the beneficiating operation.

3. In a process of separating phosphate concentrate from Florida pebble phosphate washer debris wherein said debris is pulped with water, the pulped debris separated into a fraction A of high solids content including substantially all of the recoverable phosphate values and a slime fraction B containing slime and nonrecoverable phosphate, wherein fraction A is subjected to beneficiation treatment while using large additional amounts of water to separately produce therefrom a dewatered phosphate concentrate, a dewatered tailings fraction, and a low-density water fraction D containing a minor amount of recoverable phosphate, some slime, and a major amount of water; the improvements comprising separating fraction D into a fraction E comprising essentially water and a thickened fraction F of higher solids content and containing the recoverable phosphate and some of the slime, and recycling fraction F to the initial slime separating step, thus restricting the amount of water introduced therein.

4. In a process of separating phosphate concentrate from Florida pebble phosphate washer debris wherein said debris is pulped with water, the pulped debris separated into a fraction A of high solids content including substantially all of the recoverable phosphate values and a slime fraction B containing slime and nonrecoverable phosphate, wherein fraction A is subjected to beneficiation treatment while using large additional amounts of water to separately produce therefrom a dewatered phosphate concentrate, a dewatered tailings fraction, and a low-density water fraction D containing a minor amount of recoverable phosphate, some slime, and a major amount of water; the improvements comprising separating fraction D into a fraction E comprising essentially water and a thickened fraction F of higher solids content and containing the recoverable phosphate and some of the slime, recycling fraction F to the initial slime separating step, thus restricting the amount of water introduced thereto, and returning at least a portion of fraction E to the beneficiation operation.

IRA M. LE BARON.

REFERENCES CITED

The following references are of record in the file of this patent:

Ore Dressing Practice in Florida Pebble Phosphate by J. W. Pamplin, T. T. No. 881 A. I. M. M. E. in Mining Technology, January 1938.